Patented Dec. 13, 1932

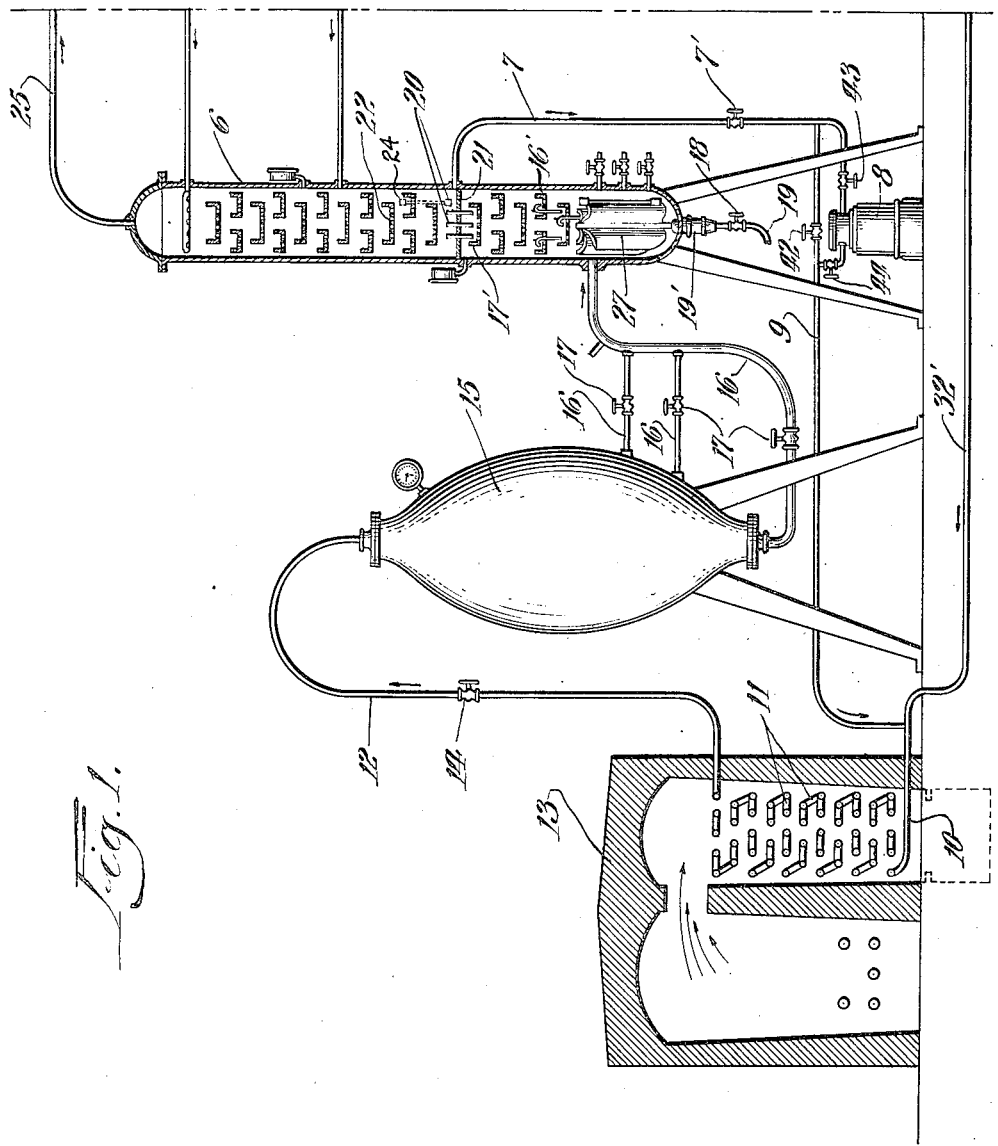

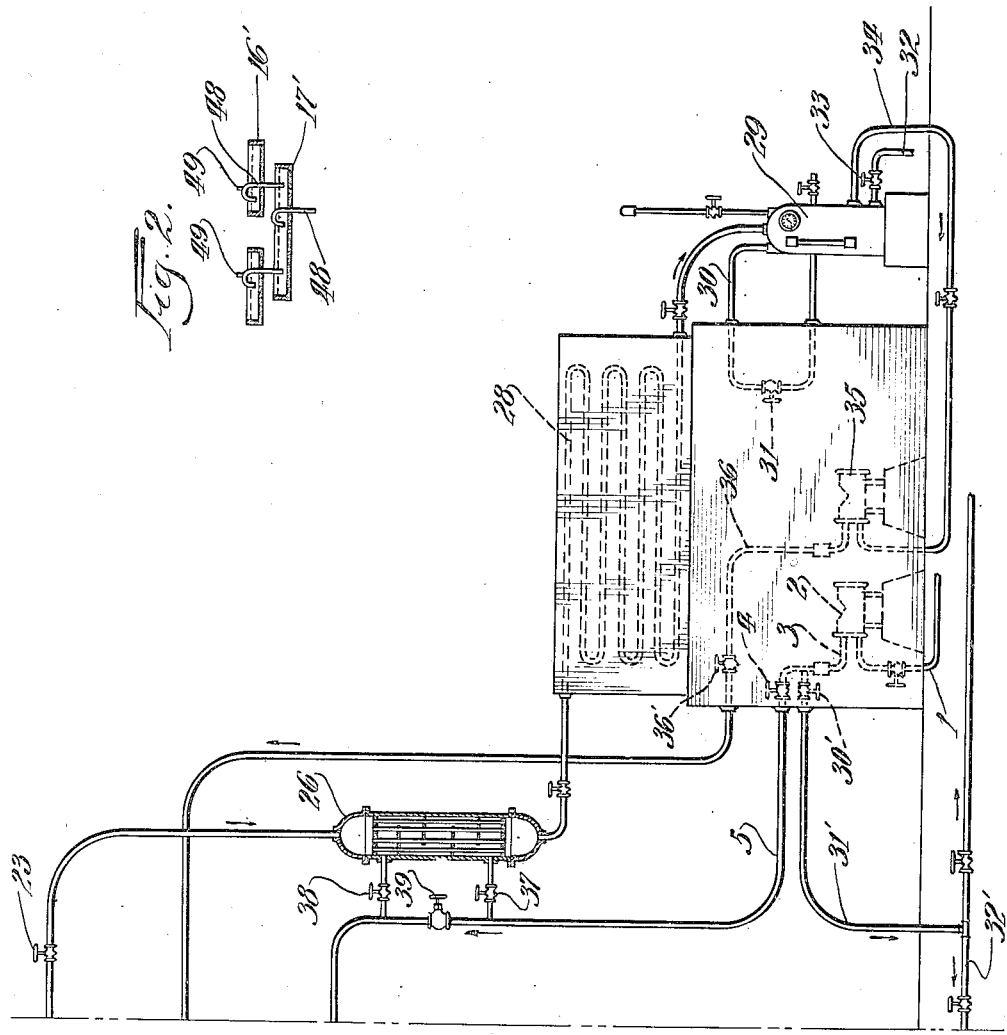

1,891,199

UNITED STATES PATENT OFFICE

CARBON P. DUBBS, OF WILMETTE, ILLINOIS, ASSIGNOR TO UNIVERSAL OIL PRODUCTS COMPANY, OF CHICAGO, ILLINOIS, A CORPORATION OF SOUTH DAKOTA

PROCESS FOR TREATING HYDROCARBONS

Application filed August 13, 1926. Serial No. 128,933.

This invention relates to improvements in a process for hydrocarbon oil conversion whereby maximum yields of low boiling point oils are obtained with a minimum production of solids and permanent gas.

Among the advantages and objects of the present invention are to provide a process and apparatus in which all of the products of reaction formed in the reaction chamber are preferably withdrawn from the lower end of said chamber and discharged into the lower end of a dephlegmator where the heat contained in these products of reaction is converted into heat of evaporation, thus preventing this high heat from remaining in the oil to cause the formation of excessive amounts of coke; to provide in a process of the character described means for maintaining a super-atmospheric pressure on the oil and products of reaction throughout the entire system, and also to provide a process and apparatus permitting a reduction of pressure on the products of reaction being discharged into the dephlegmator; to provide a process and apparatus in which the amount of carbon formation is greatly reduced, per barrel of oil treated, which permits the treatment of maximum quantities of oil over a long operating period before it is necessary to shut down for cleaning.

Briefly, the process of the present invention comprises passing the oil through heating tubes where it is subjected to the proper conversion temperature and from which it discharges into the upper end of an enlarged reaction chamber. The products of reaction are withdrawn through a single outlet from the lower end of the reaction chamber and passed to the lower end of a dephlegmator where separation of vapors will take place simultaneously with the conversion of the heat units contained in the products of reaction into heat units of evaporation. The vapors passing through the dephlegmator are subjected to the usual cooling or reflux condensing action, causing condensation of those fractions not of the desired boiling point. The vapors remaining uncondensed after passage through the dephlegmator may be condensed and collected in the usual way, while the reflux condensate may be returned for further treatment. The heavy unvaporized residue and heavy condensate may be withdrawn from the lower end of the dephlegmator and passed to suitable storage. In the dephlegmator, the reflux condensate is maintained in a separate body from the unvaporized residue and heavy condensate fractions, portions of these bodies also being withdrawn separately.

In the drawings, Fig. 1 is a side elevational view of the apparatus with certain parts in vertical section.

Fig. 2 is an enlarged cross sectional view of the pans in the lower end of the dephlegmator.

Referring more particularly to the drawings, the oil to be treated may be withdrawn from any suitable source of supply (not shown), and passed through line 1, pump 2, line 3, into line 5, controlled by throttle valve 4, the line 5 discharging into the upper end of the dephlegmator 6. This oil, together with the condensate produced in said dephlegmator, may be withdrawn through the line 7, controlled by valve 7', and if desired, may be passed to the pump 8. From pump 8 the liquid passes through lines 9 and 10 and through the cracking tubes 11, mounted in the furnace 13, wherein the oil is brought to the desired temperature. The heated oil after passing through the tubes 11 passes through transfer line 12, controlled by valve 14, discharging into the upper end of an enlarged reaction chamber 15, being withdrawn from the lower end of said chamber through the line 16, controlled by valve 17. The line 16 may discharge the products of reaction into the lower end of dephlegmator 6, the discharging liquid impinging upon the blades of the stirrer 27, thus imparting a rotation thereto to agitate the body of oil collecting in the bottom of said dephlegmator 6.

The vapors which separate pass upwardly through the various pans designated 16' and 17' in the lower section of the dephlegmator 6, the condensate descending and mixing with the pool of liquid in the bottom. Regulated portions of this liquid may be withdrawn through line 19, controlled by valve 18, being collected in any suitable storage tank (not shown) but first being preferably passed through a cooler shown diagrammatically at 19'.

The vapors continue their upward passage through the pipes 20 which extend through the plate 21 mounted in the interior of the dephlegmator, ascending through the several pans illustrated diagrammatically at 22. The condensate produced in the portion of the dephlegmator above plate 21 collects on the plate and may be withdrawn through line 7 and returned to the heating tubes 11. The vapors remaining uncondensed after passage through the dephlegmator, pass out through vapor outlet line 25, controlled by valve 23, passing through heat interchanger 26 into condenser coil 28, where they are condensed and from which the condensed liquid passes and is collected in the receiving drum 29. The uncondensable gas may be discharged through the line 30, controlled by valve 31, and the condensed distillate may be withdrawn through line 32, controlled by valve 33.

Should the quantity of charging stock being fed into the dephlegmator through line 5 be more than should be fed thereto for any reason, the amount may be decreased to the proper quantity and the remainder of the charging stock fed through line 31', controlled by valve 30', into line 32' communicating with line 10 and the heating tubes 11.

Should the vapors discharging from the upper end of dephlegmator 6 into vapor line 25 be insufficiently cooled to condense the fractions having boiling points higher than desired, then regulated portions of the distillate collected in tank 29 may be pumped through line 34, pump 35, and line 36, controlled by valve 36', into the upper end of the dephlegmator 6 to insure proper cooling.

It is to be understood that in operating a so-called cracking process for the conversion of higher boiling point oils to lower boiling point oils, such as gasoline, there are various methods of operation. It may be deemed advantageous, depending on the character of oil being treated and products desired, to produce low yields of gasoline and high yields of gas oil, fuel oil, or the like, while at other times it may be desirable to obtain just the reverse.

The following illustrative run may be given: A crude oil containing 20% gasoline may be drawn from the supply tank and pumped through the lines 3 and 5 into the upper end of the dephlegmator 6, if desired, passing through the heat interchanger 26 by opening the valves 37 and 38 and closing valve 39. If desired, of course, the heat interchanger 26 may be by-passed by closing valves 37 and 38 and opening valve 39.

In the dephlegmator 6 the oil will be relieved of its gasoline-like fractions, these fractions passing over with the vapors through line 25. The condensate derived from the cracked vapors together with the unvaporized portion of the charging stock fed through line 5 collects on pan 21, the depth of the oil being indicated by a liquid level gauge 24. Regulated portions of liquid from this body are withdrawn through lines 7 and 9 and passed through the heating tubes 11 where the oil is raised to the desired conversion temperature, say, from 750° to 1000° F., more or less, the heated oil passing through the transfer line 12 and discharging into the upper end of the reaction chamber 15. All of the products of reaction are withdrawn through a single discharge 16 located in the lower end of the reaction chamber, discharging into the lower end of dephlegmator 6. Separation of vapors will there take place. The unvaporized portions of the products of reaction together with that portion condensed below the plate 21 will collect in a body in the lower end of the dephlegmator 6, being agitated by stirrer 27. Regulated portions of this body may be withdrawn through the line 19 and sent to suitable storage. The height of the liquid body in the lower end of the dephlegmator 6 is indicated by a suitable gauge. The separated uncondensed vapors pass up through pipes 20 into the upper part of dephlegmator 6, and as they ascend through this upper part of the dephlegmator, the heavier or higher boiling point fractions are condensed and mixed with the unvaporized portion of the charging stock fed to the dephlegmator through line 5. The vapors remaining uncondensed after passage through the dephlegmator pass out through vapor outlet 25 and are collected in the receiver 29 after being condensed in condenser coil 28.

The entire system may be maintained under a uniform super-atmospheric pressure of from 50 to 1000 pounds more or less, or differential pressures may be maintained, as will hereinafter be more particularly brought out.

The selection of the particular temperatures and pressures to be used within the range above specified will be determined by the particular oil being used and the products which it is desired to produce, as will be well understood by those versed in the art.

As a feature of the present invention, the super-atmospheric pressure maintained on the products of reaction may be reduced in passing through the valve 17, which reduction may comprise a reduction down to atmospheric pressure or sub-atmospheric pressure, it being understood that when operating at sub-atmospheric pressure an exhaust or vacuum apparatus would be used (not shown).

One of the main underlying principles of the present invention resides in the idea of discharging the heated oil into the upper end of the reaction chamber and almost immediately withdrawing the products of reaction through a single outlet from the lower end of the reaction chamber, the reaction chamber functioning merely to permit the minimum time element necessary to produce the desired reaction. By withdrawing all of the products of reaction from the lower end of the reaction chamber, no liquid oil will be permitted to remain in said chamber. In addition, discharging of the products from the reaction chamber into the dephlegmator results in a lesser production of solid matter and a greater recovery of liquids than where separation of vapors takes place in the reaction chamber. Thus, a greater quantity of oil may be treated before it is necessary to shut down for the purpose of cleaning, which, of course, is a considerable commercial advantage. The heat which normally is passed to the unvaporized liquid body collecting in the reaction chamber, and which causes excessive formation of carbon, will be dissipated or converted into heat of evaporation in the lower end of the dephlegmator which, of course, will materially decrease the normal carbon formation. The stirrer 27 serves to maintain the liquid body in an agitated condition, thus preventing the formation and accumulation of an excessive amount of solid matter. The liquid withdrawn from the lower end of the dephlegmator through the pipe 19 will be found to contain relatively small amounts of solid matter, thus permitting the utilization of this withdrawn product as a commercial fuel.

Valves 42, 43 and 44 are utilized when the pump 8 is by-passed.

Referring more particularly to Fig. 2, which represents the pans in the lower end of dephlegmator 6, the overflow pipe for carrying the liquid from the upper pan 16' to the lower pan 17' is marked 48. This pipe preferably has a vent 49, as shown. These pans in the embodiment illustrated in Fig. 2 are preferably not perforated in order that they will retain a certain quantity of liquid. The heated vapors contacting the bottom of these pans as they ascend will redistill any of the light ends contained in this oil.

It will be understood that while I have shown diagrammatically a particular apparatus, nevertheless it is susceptible of wide modifications with the modifying principles taught in the invention. It is also well understood that the higher the percentage of oil cracked into lower boiling point products, such as gasoline, the greater the amount of carbon that will be produced, and where the operation is such as to cause a rapid accumulation of carbon in the lower end of the dephlegmator necessitating frequent shutdowns for cleaning, then this section of the dephlegmator may be enlarged accordingly to take care of this condition which, of course, will be readily understood by those versed in the art. This condition may also be taken care of by substituting for the lower section of the dephlegmator two enlarged traps in which carbon may be accumulated, one being in use while the other is being cleaned, thus avoiding the shutting down of the plant until it is necessary to clean the rest of the apparatus.

I claim as my invention:

1. A method for treating hydrocarbon oil comprising heating the oil to a cracking temperature while flowing through a coil in a heating zone, delivering the heated oil from the coil to an enlarged reaction zone, maintaining a substantially superatmospheric pressure on the oil in the coil and reaction zone, delivering the oil from the reaction zone to a secondary zone of reduced pressure wherein substantial vaporization is effected, maintaining the oil in said secondary zone in a turbulent condition by utilizing energy made available by the release of pressure on the liquid products delivered from said reaction zone to said secondary zone to mechanically agitate the oil in said secondary zone.

2. A method of hydrocarbon oil conversion comprising heating the oil to a conversion temperature and permitting reaction to take place in an enlarged reaction zone, introducing all of the products of reaction into a dephlegmating zone wherein separation of vapors takes place, subjecting the vapors to reflux condensation, withdrawing unvaporized residue with heavier fractions of reflux condensate from said dephlegmating zone, separately withdrawing lighter fractions of reflux condensate from said dephlegmating zone and returning the same to the system for retreatment, maintaining a substantial superatmospheric pressure on the oil while being heated and while passing through the reaction zone, reducing the pressure on the product passing from the reaction to the dephlegmating zone and maintaining the oil in the lower end of said dephlegmating zone in a turbulent condition by utilizing energy made available by the release of pressure on the products of reaction introduced to said dephlegmating zone to mechanically agitate the oil in said dephlegmating zone.

3. A hydrocarbon oil cracking process which comprises heating a flowing stream of the oil to cracking temperature under pressure, discharging the hot oil stream into the upper portion of a substantially vertically disposed unheated reaction zone maintained under pressure, passing all of the hot oil constituents from said stream downwardly thru said reaction zone and effecting conversion therein, removing all of said oil constituents from the lower portion of said zone and lowering the pressure thereon to effect a separation of vaporizable fractions from residuum, and subjecting the resultant vapors to dephlegmation and condensation.

4. A continuous process for cracking high boiling point hydrocarbon oils to produce gasoline-like products comprising passing the oil once only through a heating coil wherein the oil is raised to an effective cracking temperature under a superatmospheric pressure, discharging the heated products from the coil to the upper end of an unheated vertically elongated reaction chamber also maintained under pressure and wherein said products are subjected to an additional minimum time of reaction while at a cracking temperature, preventing any appreciable accumulation of liquid in said chamber, removing all the products from said chamber from the lower end thereof, delivering said products to a zone of lower pressure wherein separation of vapors is in large part effected by the contained heat of the oil, withdrawing the unvaporized residue from said zone of lower pressure in a form suitable as a liquid fuel, passing the vapors from said zone of lower pressure to a dephlegmating zone, effecting partial condensation of the vapors in said dephlegmating zone by the cooling action of charging oil for the process, condensing the vapors uncondensed by dephlegmation and collecting the resulting distillate, and continuously pumping charging oil and reflux condensate from said dephlegmating zone to and through said heating coil.

5. A process for the conversion of heavy hydrocarbon oil into gasoline-like products which comprises passing the heavy oil in a restricted stream through a heating zone and heating the same therein to cracking temperature under a superatmospheric pressure sufficient to retain a substantial portion of the oil in liquid condition, discharging the hot oil stream into the upper portion of a vertically elongated reaction zone maintained at cracking temperature solely by the heat imparted to said stream, and under a pressure substantially the same as that imposed upon the oil in said heating zone, passing all of the hot oil constituents from said stream downwardly through said reaction zone from the upper portion to the lower portion thereof, continuously withdrawing all the hot oil constituents from the lower portion of said reaction zone at such a rate that no appreciable liquid accumulation occurs therein, separating said hot oil constituents into vapors and unvaporized oil and preventing return of the latter to said heating zone, dephlegmating the vapors to condense fractions thereof heavier than gasoline, and condensing the dephlegmated vapors.

6. A process for the conversion of heavy hydrocarbon oil into gasoline-like products which comprises passing the heavy oil in a restricted stream through a heating zone and heating the same therein to cracking temperature under a superatmospheric pressure sufficient to retain a substantial portion of the oil in liquid condition, discharging the hot oil stream into the upper portion of a vertically elongated reaction zone maintained at cracking temperature solely by the heat imparted to said stream and under a pressure substantially the same as that imposed upon the oil in said heating zone, passing all of the hot oil constituents downwardly through said reaction zone from the upper portion to the lower portion thereof, continuously withdrawing the hot oil constituents from the lower portion of said reaction zone at such a rate that no appreciable liquid accumulation occurs therein, separating said hot oil constituents into vapors and unvaporized oil by pressure-reduction and preventing return of the unvaporized oil to said heating zone, dephlegmating the vapors to condense heavier fractions thereof as reflux condensate, condensing the dephlegmated vapors and introducing regulated portions of the resultant distillate into direct contact with the vapors undergoing dephlegmation to serve as a dephlegmating medium for the vapors, and returning to said heating zone reflux condensate formed in the dephlegmation.

7. The process of cracking petroleum oils which comprises continuously passing the oil in a restricted stream through a zone wherein the oil is heated to a cracking temperature, thence delivering this restricted stream of oil constituents into the upper portion of a reaction zone to have a substantial downward travel therethrough, continuously removing vapors and liquid oil from said reaction zone without permitting any substantial portion of the liquid oil so removed to mingle with the oil of said restricted stream, effecting the removal of the liquid oil at a rate adequate to prevent during normal operation of the process the accumulation of any appreciable body of oil in such reaction zone, maintaining a substantial superatmospheric pressure on the oil in said restricted stream and reaction zone, in passing the products of reaction from the lower portion of said reaction zone, and without substantial extraneous cooling thereof, to a zone maintained under lower pressure than said reaction zone and vaporizing a substantial portion of said removed products by such pressure reduction, condensing heavier fractions of the vapors evolved by the pressure reduction and returning resultant condensate to the process for recycling therethrough.

8. A process for the conversion of heavy hydrocarbon oil into gasoline-like products which comprises passing the heavy oil in a restricted stream through a heating zone and heating the same therein to cracking temperature under a superatmospheric pressure sufficient to retain a substantial portion of the oil in liquid condition, discharging the hot oil stream into the upper portion of a vertically elongated reaction zone maintained at cracking temperature solely by the heat imparted to said stream, and under a pressure substantially the same as that imposed upon the oil in said heating zone, passing all of the hot oil constituents from said stream downwardly through said reaction zone from the upper portion to the lower portion thereof, continuously withdrawing all the hot oil constituents from the lower portion of said reaction zone at such a rate that no appreciable liquid accumulation occurs therein, separating said hot oil constituents into vapors and unvaporized residual products and preventing return of the latter to said heating zone, dephlegmating the vapors to condense fractions thereof heavier than gasoline, and condensing the dephlegmated vapors.

9. A process for the conversion of heavy hydrocarbon oil into gasoline-like products which comprises passing the heavy oil in a restricted stream through a heating zone and heating the same therein to cracking temperature under a superatmospheric pressure sufficient to retain a substantial portion of the oil in liquid condition, discharging the hot oil stream into the upper portion of a vertically elongated reaction zone maintained at cracking temperature solely by the heat imparted to said stream and under a pressure substantially the same as that imposed upon the oil in said heating zone, passing all of the hot oil constituents downwardly through said reaction zone from the upper portion to the lower portion thereof, continuously withdrawing the hot oil constituents from the lower portion of said reaction zone at such a rate that no appreciable liquid accumulation occurs therein, separating said hot oil constituents into vapors and unvaporized residual products by pressure reduction and preventing return of the unvaporized residual products to said heating zone, dephlegmating the vapors to condense heavier fractions thereof as reflux condensate, condensing the dephlegmated vapors and introducing regulated portions of the resultant distillate into direct contact with the vapors undergoing dephlegmation to serve as a dephlegmating medium for the vapors, and returning to said heating zone reflux condensate formed in the dephlegmation.

10. The method of cracking hydrocarbon oil, which comprises heating the oil to cracking temperature in a zone of restricted cross section, then passing all the oil directly from said zone downward through a cracking zone of large cross section, in which a substantial amount of cracking takes place, without additional application of heat, the cracking zone of large cross section being substantially maintained free of oil in the liquid phase by passing the liquid and vapor through a bottom outlet in said cracking zone, passing the resulting products to a rectifying zone, and segregating the desired cracked product.

11. A process for cracking hydrocarbon oil, which comprises heating a stream of oil to a cracking temperature, discharging the heated stream of oil while at cracking temperature into an unheated reaction zone wherein conversion of the oil constituents occurs solely by the heat imparted to said stream, in causing vapors and non-vaporized oil to flow downwardly in an uninterrupted path through said reaction zone, removing unvaporized oil from the lower part of said reaction zone at a rate adequate to preclude any appreciable accumulation of liquid residue in the reaction zone, also removing vaporous constituents from the lower part of said reaction zone, and maintaining a superatmospheric pressure on the stream of oil and on the reaction zone.

CARBON P. DUBBS.